(12) United States Patent
Lahr et al.

(10) Patent No.: US 10,804,759 B1
(45) Date of Patent: Oct. 13, 2020

(54) CYCLOIDAL ELECTRIC MACHINE WITH MINIMIZED AIRGAP

(71) Applicant: GM Global Technology Operations LLC, Detroit, MI (US)

(72) Inventors: Derek F. Lahr, Howell, MI (US); Alireza Fatemi, Canton, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 16/392,060

(22) Filed: Apr. 23, 2019

(51) Int. Cl.
  *H02K 1/24* (2006.01)
  *H02K 1/14* (2006.01)
  *H02M 7/46* (2006.01)
  *H02K 21/02* (2006.01)

(52) U.S. Cl.
  CPC ............ *H02K 1/246* (2013.01); *H02K 1/14* (2013.01); *H02K 21/025* (2013.01); *H02M 7/46* (2013.01)

(58) Field of Classification Search
  CPC ...... H02K 21/029; H02K 21/16; H02K 7/006; H02K 11/0094; H02K 11/33; H02K 2201/18; H02K 1/246; H02K 1/24; H02K 1/14; H02K 3/28; H02K 3/52; H02K 19/12; H02K 21/025; B60Y 2200/91; B60Y 2400/60; B60L 50/60; H02P 27/06

USPC ..... 310/216.001, 216.075, 216.107, 216.092
See application file for complete search history.

(56) References Cited

U.S. PATENT DOCUMENTS

| | | | |
|---|---|---|---|
| 2008/0289440 A1* | 11/2008 | Denk | F16C 31/00 74/89.34 |
| 2010/0123426 A1* | 5/2010 | Nashiki | H02K 1/12 318/701 |

* cited by examiner

*Primary Examiner* — Thomas Truong
(74) *Attorney, Agent, or Firm* — Quinn IP Law (57) ABSTRACT

An electrical system includes a cycloidal electric machine having a stator and an eccentric rotor. An airgap is defined between the stator and the rotor. The rotor moves with two degrees of freedom (2DOF), including rotating motion about the rotor axis and orbiting motion about the stator axis. A rotor constraint mechanism (RCM) constrains rotor motion to enable output torque to transfer to a coupled load in at least one of the 2DOF. The machine includes a structural element connected to or formed integrally with the rotor or stator that minimizes and substantially equalizes a size of the airgap around a circumference of the rotor. The element may be a crescent-shaped race of ferrous material coupled to a rotor shaft. The stator may include stator teeth, the rotor may include lobes, and the stator teeth and rotor lobes may have cycloid-profiled surfaces that form the structural element.

20 Claims, 6 Drawing Sheets

CYCLOIDAL ELECTRIC MACHINE WITH MINIMIZED AIRGAP

INTRODUCTION

Rotary electric machines configured as motors or electric generators include a rotating member ("rotor") and a stationary member ("stator"). The rotor may be disposed radially within or outside of the stator. Equally-spaced radial slots formed around a perimeter of a cylindrical stator core are wound with copper wire or bar segments to form stator electromagnets. A polyphase input voltage is then applied to individual phase leads of the stator windings to form a set of stator electromagnets. Sequentially energizing the stator electromagnets around the circumference of the stator core generates a rotating magnetic field.

Reluctance machines are of particular type of rotary electric machine used in high-power/high-torque applications. In a variable reluctance machine, for instance, magnetic poles are induced in a ferrous rotor core when the above-noted stator electromagnets are energized. Forces generated by magnetic reluctance of the ferrous material used to construct the rotor core cause the rotor's magnetic poles to seek alignment with the nearest stator pole. That is, as magnetic flux through the rotor core follows the path of least reluctance, the nearest rotor pole will move toward alignment with the proximate stator pole. However, as the stator field continues to rotate, so too does the rotor, with the stator poles leading the rotor poles to produce desired machine rotation.

SUMMARY

The present disclosure relates to improvements in construction of reluctance machines and other radial flux-type rotary electric machines having a stator and an eccentrically-positioned rotor. As described in general below, rotor eccentricity enables the rotor to orbit with respect to the stator, e.g., radially within the stator core in an embodiment in which the rotor is surrounded by the stator. As the rotor's output shaft also rotates about its own axis of rotation, an eccentric rotor enables two degrees of freedom (2DOF) of motion, i.e., rotation/rolling motion and orbiting motion. Rotor eccentricity also allows the rotor to be reduced in size relative to a concentric stator-rotor configuration.

However, the benefits of an eccentric rotor construction are offset by a torque penalty, as the size of a radial airgap between the stator and rotor differs around the inner circumference or perimeter of the stator core depending on the orbiting position of the rotor. In other words, the radial airgap is minimal or nonexistent at the instantaneous center of rotation of the rotor, i.e., the orbiting rotor's point of rolling contact with or point of closest proximity to the stator, and larger at a point diametrically opposite the instantaneous center of rotation. The larger airgap results in lower levels of achievable output torque, for the various reasons set forth herein. The present approach seeks to minimize and substantially equalize the size of this stator-rotor airgap and thereby increase the available output torque without requiring enlargement of the rotor.

Two example structural elements for reducing and equalizing the size of the airgap around the entire perimeter of the rotor are disclosed herein: (1) a crescent-shaped ferromagnetic race that rotates in the air gap in conjunction with the rotor's output shaft, and (2) cycloidal profiled surfaces on respective teeth and lobes of the stator and rotor. Both approaches are described in detail herein with reference to the various Figures.

With respect to rotor eccentricity, the rotary electric machine described herein is "cycloidal" in the sense that the rotor is constrained to move with the 2DOF noted briefly above: (1) rotary or rolling motion around the rotor's axis of rotation, and (2) orbiting motion around the stator's axis. For a typical rotary electric machine, the electromagnetic torque present within the stator-rotor airgap may be derived using the following equation [1], with t and r respectively denoting radial and tangential torque components in an example cylindrical coordinate system:

$$T_e = F_t R L_{ef} \qquad [1]$$

In equation [1], $T_e$ is the electromagnetic torque in newton-meters, R is the average radius of the airgap in meters, $L_{ef}$ if the effective stack length of the active materials of the electric machine, also in meters, and $F_t$ is the tangential forces present within the airgap in newtons. The tangential forces, $F_t$, are defined as:

$$F_t = \frac{P}{2}\int_0^{2\pi} f_t(\phi_r) R d\phi_r \qquad [2]$$

where P is the number of poles of the electric machine, $f_t$ represents the tangential component of the airgap force density per unit length, and $\phi_r$ is the electrical angle covering each pole pair in radians.

According to the relationships expressed in equations [1] and [2], the radial airgap forces, which are several times larger than the tangential forces, do not contribute to the output torque of the electric machine. The embodiments with the airgap-reducing structural elements described in detail below are therefore intended to incorporate otherwise unused radial airgap forces into the output torque in order to realize certain performance advantages, including the production of higher levels of motor output torque at lower motor speeds with a rotor having reduced size.

In an example embodiment, an electrical system includes a power inverter module (PIM) connect to a direct current (DC) voltage bus, a polyphase cycloidal electric machine connected to the PIM, and cylcoidal electric machine. The electric machine has a stator and a rotor with respective stator and rotor axes. The rotor axis is eccentric with respect to the stator axis, an airgap is defined between the stator and the rotor, and the rotor moves with two degrees of freedom (2DOF), the 2DOF including rotating motion about the rotor axis and orbiting motion about the stator axis. A rotor constraint mechanism (RCM) of the electric machine or system is configured to constrain motion of the rotor, such that the rotor generates and transmits output torque to a coupled load in at least one of the 2DOF. The electric machine includes a structural element connected to or formed integrally with the rotor or the stator that is configured to minimize and substantially equalize a size of the airgap around a circumference of the rotor.

The structural element may be a crescent-shaped race constructed of ferrous material coupled to a rotor shaft of the rotor, and extending along a length of the rotor. The crescent-shaped race remains opposite an instantaneous center of rotation of the electric machine as the rotor orbits about the stator axis. The crescent-shaped race may include race teeth and define race slots, each respective one of which is separated by an adjacent pair of the race teeth.

The stator may include stator teeth with stator slots therebetween, and stator electromagnets, each of the latter of which is disposed within a respective one of the stator slots. The electric machine has at least twice as many race slots as stator slots.

The race slots are at least as wide as the airgap in some embodiments, and the race teeth are less than half as wide as the stator slots.

The stator may include radially-inward projecting stator teeth, the rotor may include radially-outward projecting lobes, and the stator teeth and rotor lobes have respective cycloid-profiled surfaces that together form the structural element.

The cycloid-profiled surfaces of the stator teeth form stator lobes, and the stator has at least 1.5 times as many of the stator teeth as the stator lobes in an embodiment.

The cycloid-profiled surfaces of the stator teeth may form (N) stator lobes, the rotor has (n) rotor lobes, and n=N−1.

A downstream coupling mechanism may be coupled to the rotor and configured to translate the 2DOF into 1DOF, with the 1DOF being the rotating motion without the orbiting motion.

The load may be a drive axle of a vehicle.

In another disclosed embodiment, a cycloidal electric machine includes a cylindrical stator having a stator axis, and a cylindrical rotor having a rotor axis that is positioned radially within the cylindrical stator such that the rotor axis is eccentric with respect to the stator axis, and such that an airgap is defined between the stator and the rotor, wherein the rotor is configured to move with two degrees of freedom (2DOF). The DOF includes rotating motion about the rotor axis and orbiting motion about the stator axis. The machine also includes a rotor constraint mechanism (RCM) is configured to constrain motion of the rotor, such that the rotor is able to generate and transmit output torque to a coupled load in at least one of the 2DOF. A structural element is connected to or formed integrally with the cylindrical rotor or the cylindrical stator that is configured to minimize and substantially equalize a size of the airgap around a circumference of the rotor.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

Figure 1:
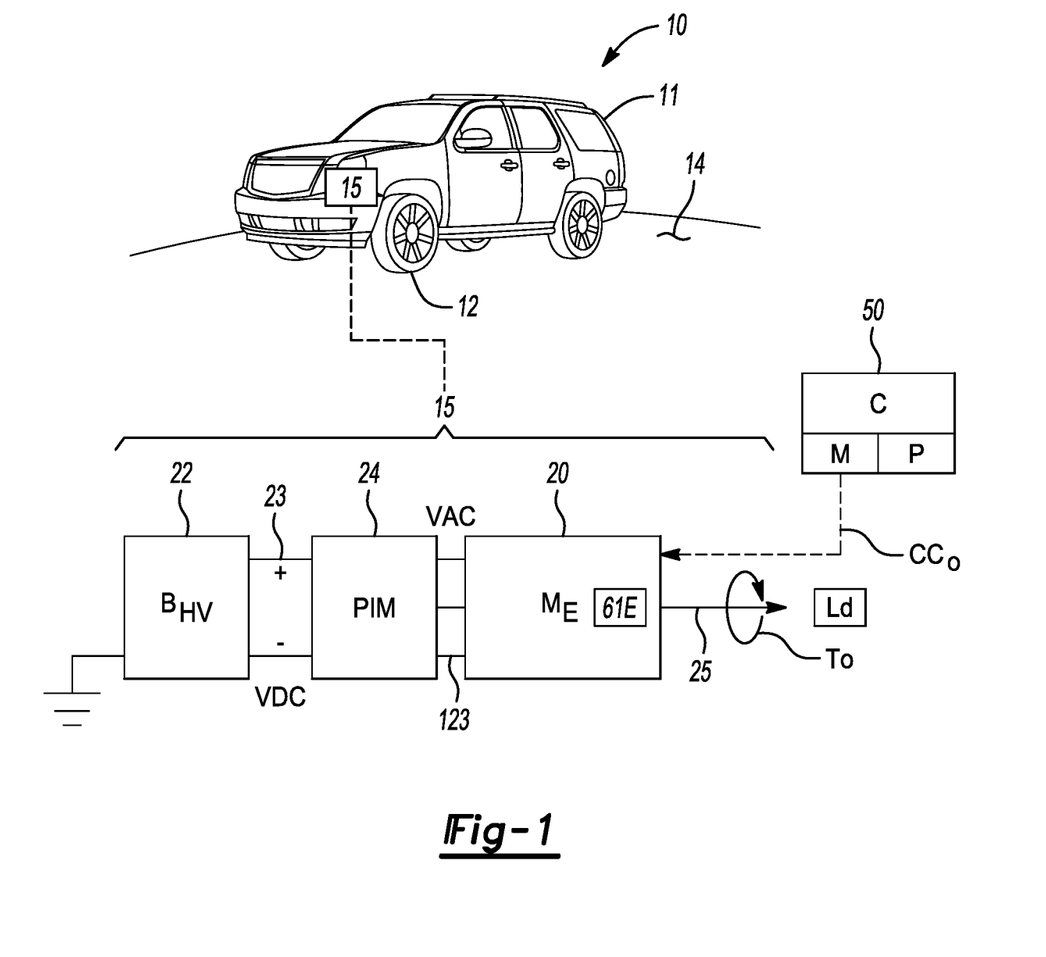
FIG. 1 is a schematic illustration of an example electrical system having a cycloidal rotary electric machine with an eccentric rotor-stator arrangement and airgap-reducing structural element(s) as described herein.

Referring to the drawings, wherein like reference numbers refer to the same or like components in the several Figures, an electrical system 15 is shown schematically in FIG. 1. The electrical system 15 may be used in various systems, including as part of a drivetrain of a motor vehicle 10 having a body 11 and road wheels 12 in contact with a road surface 14. The electrical system 15 may be used in other types of vehicles, for instance aircraft, watercraft, and rail vehicles, or in other mobile non-vehicular applications such as robots and mobile platforms. Stationary applications may likewise benefit from use of the electrical system 15, and therefore the motor vehicle 10 of FIG. 1 is just one possible beneficial application of the present teachings.

The electrical system 15 includes a rotary cycloidal electric machine ($M_E$) 20, e.g., a reluctance machine. The electric machine 20 includes a gap-reducing structural element 61E in which a stator-rotor airgap is equalized and minimized in size as set forth below with reference to FIGS. 5-9. An output member 25 of the electric machine 20 is coupled to a rotor 30 (see FIG. 2) to deliver output torque (arrow $T_O$) to a coupled load (Ld) 26, e.g., the road wheels 12 or a drive axle (not shown). The rotor 30 is sufficiently balanced to provide a desirable low level of noise, vibration, and harshness during operation of the electric machine 20, and to ensure the rotor 30 does not wobble or vibrate beyond its constrained two degrees of freedom.

As will be understood by those of ordinary skill in the art, reluctance machines, e.g., synchronous, switched, or variable reluctance machines, are characterized by an absence of permanent magnets on the rotor 30, and instead induce non-permanent magnetic poles on the rotor 30. The output torque (arrow $T_O$) is ultimately generated as a result of forces on the rotor 30 due to magnetic reluctance. The electric machine 20 is operable for providing motion with the above-described 2DOF, i.e., rotary and orbiting motion as respectively shown in FIGS. 3 and 4. Enhancements to the cycloidal electric machine 20 are included within the scope of the disclosure to minimize the size of an airgap between the rotor 30 and the stator 32, also shown in FIG. 2. The present teachings are intended to make beneficial use of otherwise largely unused radial airgap forces in the overall composition of the output torque (arrow $T_O$), while at the same time minimizing the airgap to ensure that such output torque is maximized.

In the illustrated example embodiment of FIG. 1, the electrical system 15 includes a battery ($B_{HV}$) 22 and a power inverter module (PIM) 24. The battery 22 may optionally have a relatively high voltage capacity, e.g., 60-volts or more depending on the embodiment, and thus "high-voltage" is indicated by subscript "HV". The cycloidal electric machine 20 may be embodied as a polyphase electric motor, for instance, and thus may be electrically connected to an AC bus 123, with the electric machine 20 energized by an AC voltage (VAC) from the PIM 24. The PIM 24 in turn is connected to the battery 22 via a DC voltage bus 23, with a DC voltage (VDC) supplied by the DC voltage bus 23 to the PIM 24 and vice versa depending on whether the cycloidal electric machine 20 functions in its capacity as a motor or as a generator.

When energized, the cycloidal electric machine 20 generates and outputs the output torque (arrow $T_O$) to the driven load 26 via the output member 25, for instance to a connected drive axle and/or the drive wheels 12 of the example motor vehicle 10. Operation of the electrical system 15 may be regulated by a controller (C) 50 via control signals (arrow $CC_O$). The controller 50 may include a processor (P) and tangible, non-transitory memory (M), including read only memory in the form of optical, magnetic, or flash memory. The controller 50 may also include sufficient amounts of random-access memory and electrically-erasable programmable read only memory, as well as a high-speed clock, analog-to-digital and digital-to-analog circuitry, and input/output circuitry and devices, as well as appropriate signal conditioning and buffer circuitry.

Figure 2:
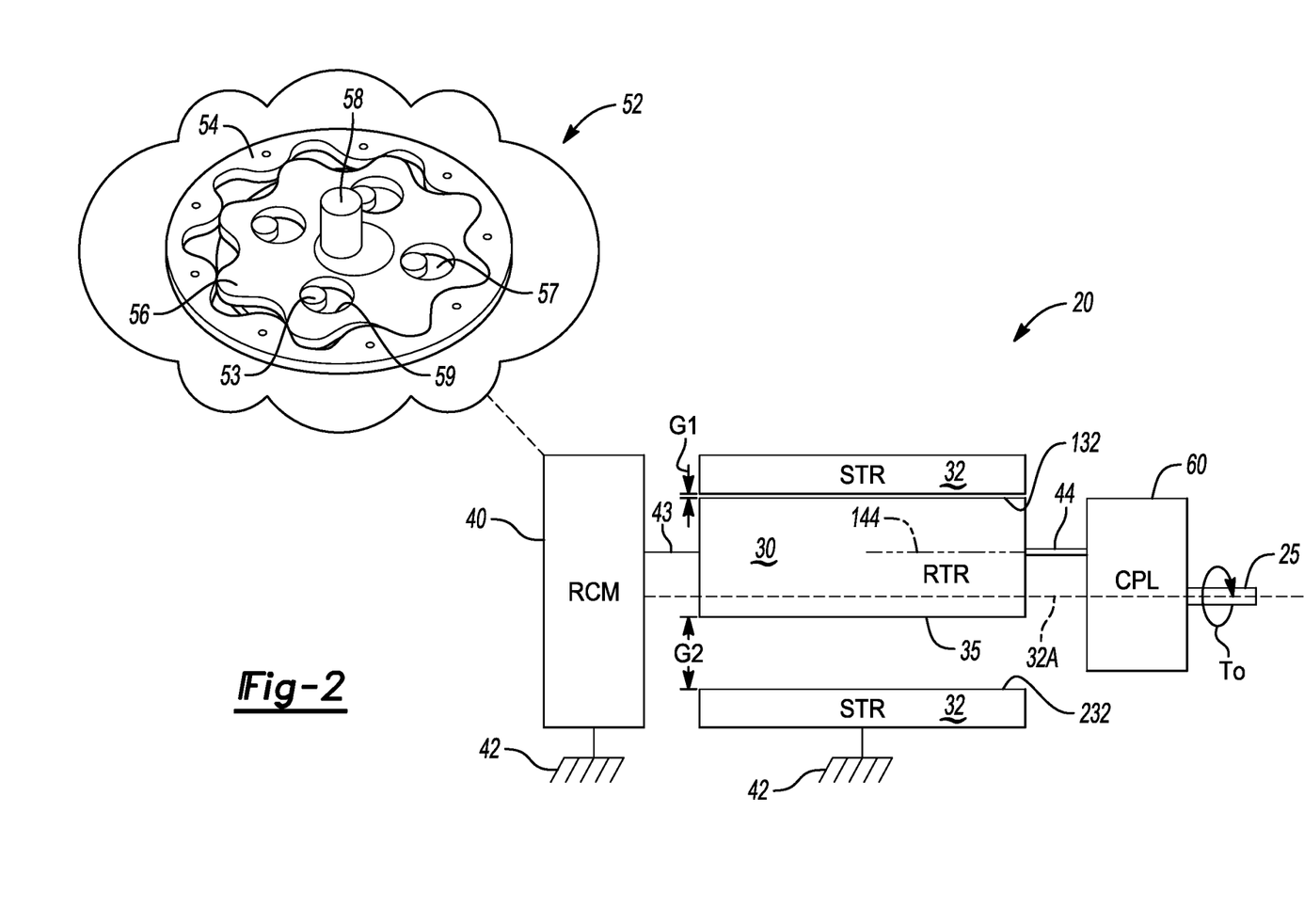
FIG. 2 is a schematic illustration of an electric machine that is usable as part of the electrical system shown in FIG. 1.
Figure 7:
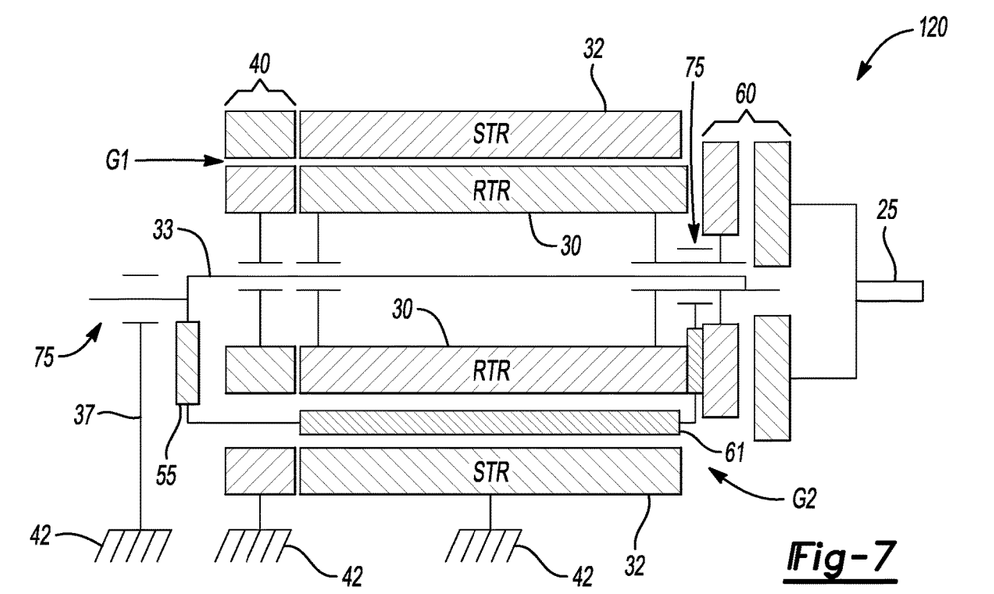
FIG. 7 is a schematic cross-sectional side-view illustration the cycloidal reluctance machine of FIG. 5.

Referring to FIG. 2, with the gap-reducing structural element 61E of FIG. 1 removed for illustrative clarity but shown in FIG. 7, the rotor (RTR) 30 is eccentrically-positioned and radially disposed with respect to the stator (STR) 32, which may be grounded to a stationary member 42 as shown. The electric machine 20 may include a housing (not shown) in which the rotor 30, the stator 32, and other components are disposed and structurally supported. The stator 32 may be separated from the rotor 30 by the above-noted airgap (G1, G2), with the stator 32 in continuous contact with or close proximity to the rotor 30 at an instantaneous center of rotation (COR) (see FIG. 3), without sliding against the rotor 30. Eccentric positioning of the rotor 30 relative to the stator 32 provides the rotor 30 with the above-noted 2DOF, i.e., rotating motion and orbiting motion.

The rotor 30 is surrounded or circumscribed by the stator 32 in the illustrated example cylindrical embodiment of FIG. 2, with an output shaft 44 of the rotor 30 free to rotate about a rotor axis 144, while the rotor 30 orbits around a center axis 32A of the stator 32, with the center axis 32A also referred to herein as the stator axis 32A. The rotor 30 and stator 32 are separated by the airgap (G1, G2), with G1 and G2 referring to the same airgap at different locations. That is, depending on the orbiting position of the rotor 30 within the stator 32 at a given instant, the rotor 30 may be approach an inner circumferential surface wall of the stator 32, i.e., airgap G1, at which position the rotor 30 is farthest away from a diametrically-opposite surface of the stator 32, which results in the airgap G2 being larger than airgap G1. As the rotor 30 orbits within the stator 32, the relative size of airgaps G1 and G2 continuously changes, i.e., the airgap G2 will become smaller than airgap G1 when the rotor 30 orbits 180-degrees away from the position that is depicted in FIG. 2.

The electric machine 20 may be connected to or includes a rotor constraint mechanism (RCM) 40. The RCM 40 is configured to constrain motion of the rotor 30 such that the rotor 30 is able to generate useful application-specific torque on a coupled load. In certain embodiments, portions of the RCM 40 may be integrally formed with the structure of the rotor 30, while in other embodiments the RCM 40 may be embodied as an external set of components, e.g., portions of a cycloidal gear set 52 powering an output shaft 58 that rotates in a direction opposite to that of the output shaft 44.

General operation of the electric machine 20 may be understood with reference to the cycloidal gear set 52 shown as an inset in FIG. 2. The cycloidal gear set 52 has a grounded/stationary outer gear element 54, within which is disposed the cycloidal disc 56. The cycloidal disc 56 defines equally-spaced holes 59. Pins 53, e.g., cylindrical posts as shown, may axially-extend from a gear element 57. The particular 2DOF motion enabled by the cycloidal gear set 52 will be appreciated by one of ordinary skill in the art, e.g., as a speed reduction mechanism.

The electrical system 15 shown schematically in FIG. 1 may incorporate certain structural functional aspects of the example cycloidal gear set 52 into its constituent structure without bodily incorporating the cycloidal gear set 52 itself. For instance, the function of the stationary outer gear element 54 and the cycloidal disc 56 may be integrated into the structure of the RCM 40, with an input member 43 of the rotor 30 possibly bolted to structure of the RCM 40 corresponding to cycloidal disc 56. Such structure enables the rotor 30 to be constrained so as to rotate about rotor axis 144 and, at the same time, to orbit about stator axis 32A. At least part of the RCM 40 may be integrally formed with the rotor 30 in certain embodiments. For instance, a profile of the rotor 30 may be constructed to approximate or match a profile of the illustrated cycloidal disc 56 of the example cycloidal gear set 52, with the stator 32 being similarly constructed to form the mating profile of the outer gear 54.

The electric machine 20 may include an optional coupling mechanism (CPL) 60 configured to translate rotation of the rotor 30 from rotor axis 144 to the driven load 26 (see FIG. 1). The CPL 60 may be positioned downstream of the rotor 30, i.e., coupled to the output member 44 and configured to translate the 2DOF motion of the rotor 30 into 1DOF motion. As used herein, the term "1DOF motion" describes rotation of the output member 25 and the connected driven load 26 without accompanying orbiting motion. When the driven load 26 includes the above-noted drive axle or drive wheels 12 of the representative motor vehicle 10 shown in FIG. 1, for instance, the 1DOF motion of the rotor 30 ultimately powers the drive wheels 12.

Various embodiments may be envisioned for implementing the CPL 60, including but not limited to an Oldham coupling mechanism. As will be appreciated, Oldham couplings utilize a compact arrangement of discs, i.e., an input-coupled disc, an output-coupled disc, and a rotating middle disc joined to the input- and output-coupled discs by a mating tongue-and-groove connection. Alternatively, the post-and-hole configuration shown in the cycloidal gear set 52 of FIG. 2 may be used, or a gear train constructed of multiple spur gears may be employed to the same ends, with these being just a few possible ways to implement the CPL 60. Certain applications may be envisioned that make beneficial use of orbiting motion of the output member 25, e.g., when mixing cement, blending a food product, or performing another operation in which simultaneous rotation and orbiting motion is beneficial. Other possible applications may find such 2DOF motion useful, such as in propulsion systems of certain unmanned rovers or other special-purpose vehicles, or in grinders or washing machines.

Figure 3:
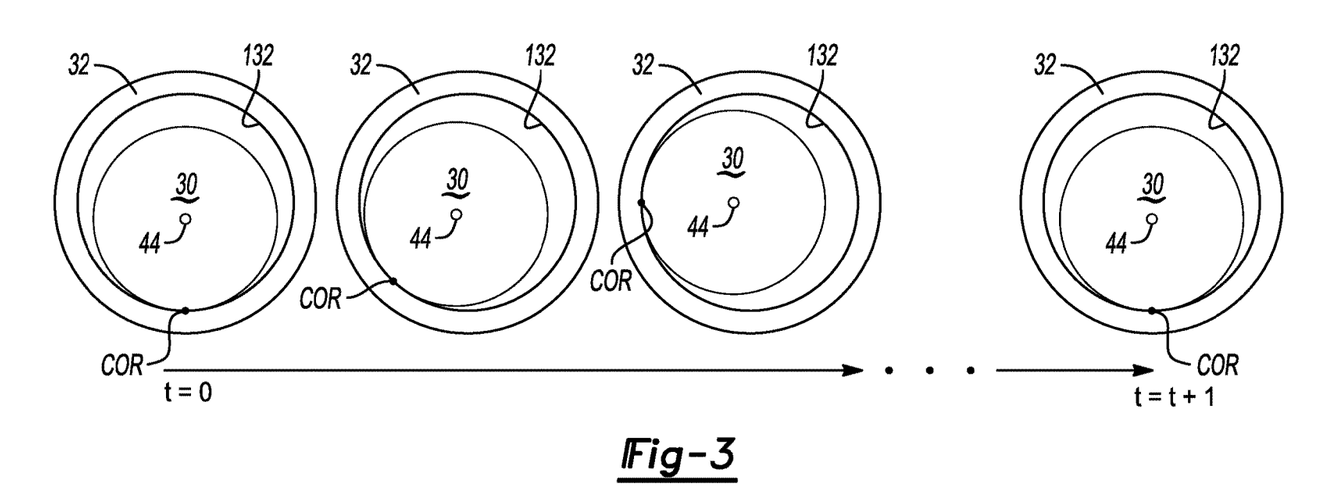
FIGS. 3 and 4 are schematic illustrations of respective rotating and orbiting motion providing two degrees of freedom of motion for the rotary electric machine of FIG. 2.
Figure 4:
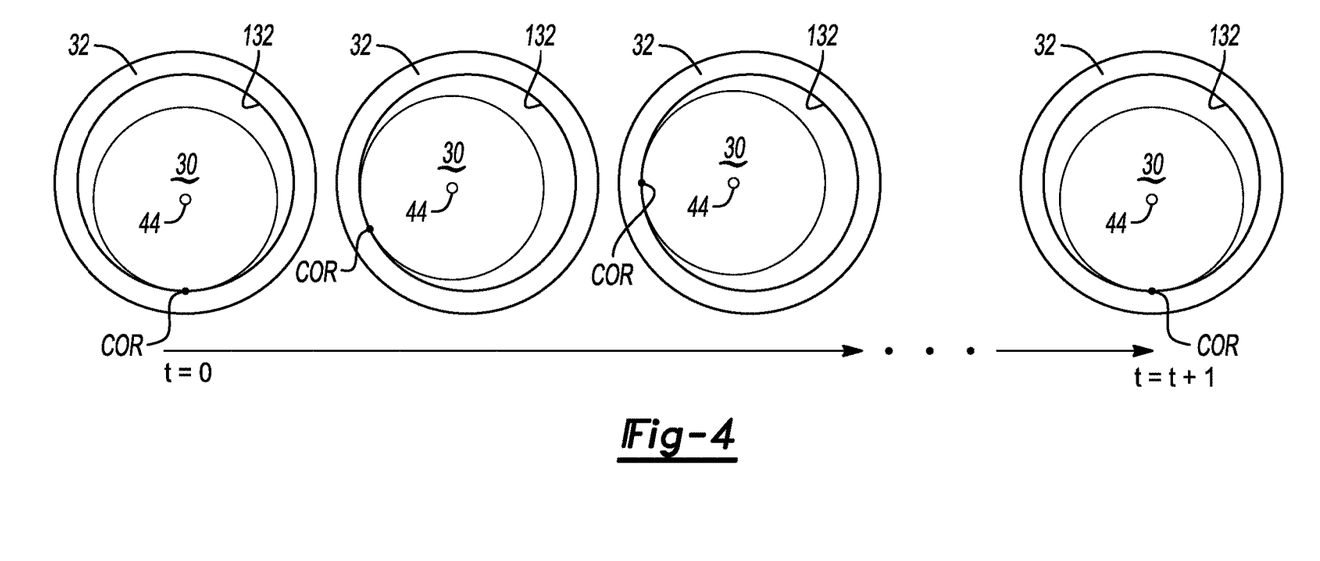

Referring briefly to FIGS. 3 and 4, the above-noted 2DOF motion is represented schematically via a sequence of motion commencing at time t=0 and continuing until a future point in time t=t+1. FIG. 3 shows an example of cycloidal motion, such that the rotor 30 has rotary motion radially within the surrounding stator 32. Such motion is indicated by the changing position of the instantaneous center of rotation (COR) between t=0 and t=t+1. FIG. 4 shows orbiting motion, such that the rotor 30 effectively slides around the inner circumferential wall 132 of the stator 32. Pure rotary motion, pure orbiting motion, or combinations of rotary and orbiting motion may be used in different applications, as noted above.

Figure 5:
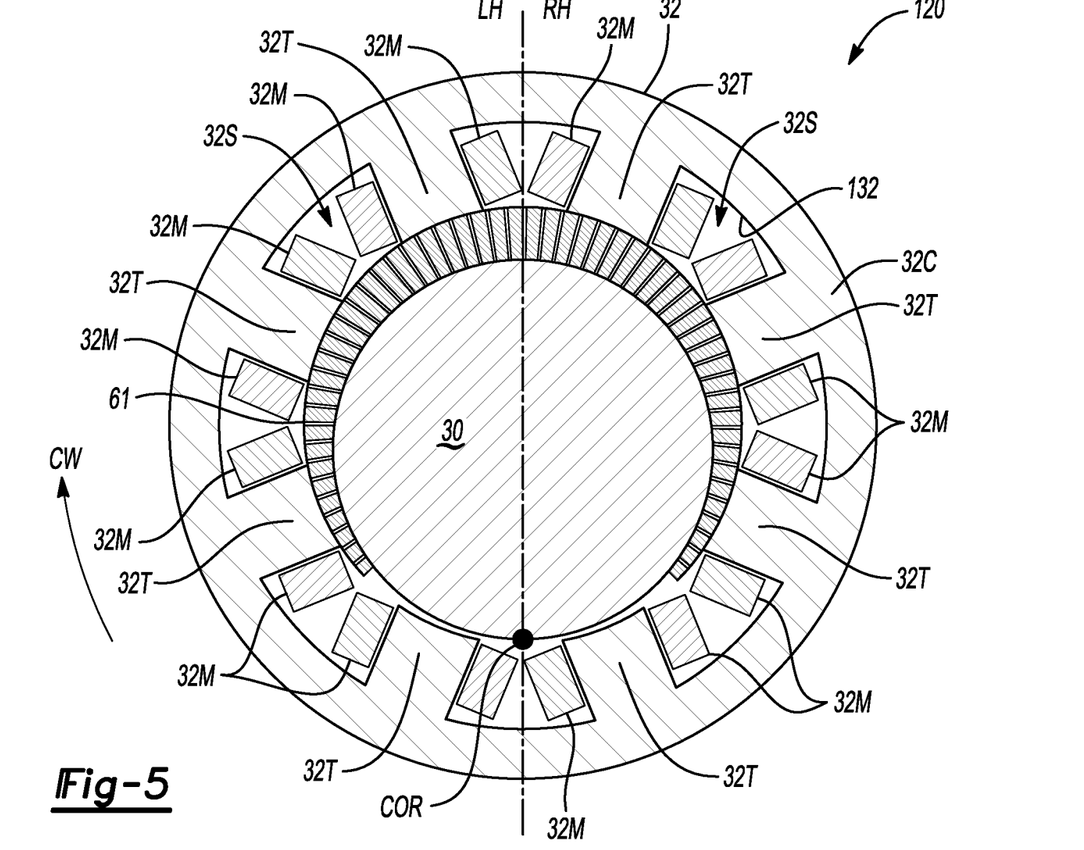
FIG. 5 is a schematic plan view illustration of an embodiment of the cycloidal reluctance machine having a crescent-shaped race constructed of ferrous materials and configured to minimize the size of an airgap between the stator and rotor within the electric machine depicted in FIGS. 1 and 2.
Figure 6:
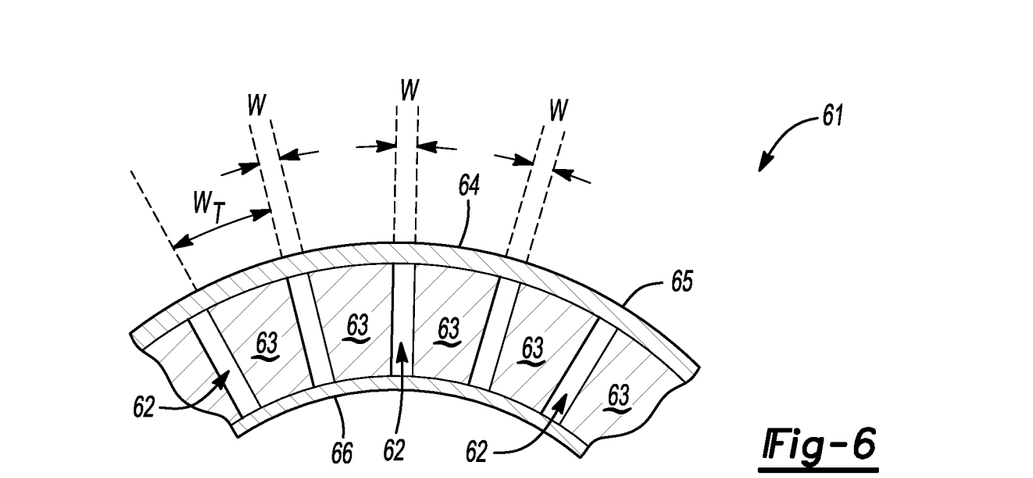
FIG. 6 is a schematic plan view illustration of a portion of the crescent-shaped race shown in FIG. 5.

Referring to FIGS. 5-7, the stator 32 of an exemplary rotary electric machine 120 has a cylindrical stator core 32C with an inner circumferential wall 132. The electric machine 120 is divided into symmetrical halves LH and RH with respect to the instantaneous center of rotation (COR), with an equal number of the stator teeth 32T located in each symmetrical half LH and RH. A plurality of stator teeth 32T project radially from the inner circumferential wall 132 toward the rotor 30, which in turn is eccentrically positioned with respect to the stator 32 in the illustrated configuration. Stator slots 32S between adjacent stator teeth 32T are wound with conductors to form stator electromagnets 32M as shown.

Due to the eccentricity of the rotor 30, orbiting motion of the rotor 30 radially within the stator 32 causes the airgap located between the stator 32 and rotor 30, absent the present teachings, to be larger at a location diametrically opposite the instantaneous center of rotation (COR) relative to the size of the stator-rotor airgap in close proximity to the COR. The gap-reducing structural element 61E shown schematically in FIG. 1 is thus used to fill the wider airgap opposite the instantaneous center of rotation, with such an airgap corresponding to airgap G2 of FIGS. 2 and 7.

An embodiment of the gap-reducing structural element 61E is shown in FIG. 5 as a crescent-shaped race 61 constructed of a laminated ferrous material, such as steel or iron, and coupled to the rotor shaft 33 via a bearing 75 as shown in FIG. 7. As depicted in detail in FIG. 6, the crescent-shaped race 61 has a plurality of race teeth 63 separated from each other by axially-extending race slots 62, the width (W) of each being equal to or larger than a width of the stator-rotor airgap with the crescent-shaped race 61 in place. For optimal performance, the number of the race slots 62 exceeds the number of the stator slots 32S of FIG. 5 by a factor of two or more, such that the electric machine 20 has at least twice as many race slots 62 as stator slots 32S. In order to minimize flux leakage, the width (W) of each slot 62 should be at least as large as the airgap at its minimum, i.e., the smallest radial distance between the crescent-shaped race 61 and the stator teeth 32T of FIG. 5, while a width ($W_T$) of each respective one of the race teeth 63 is less than half of the width of the stator slots 32S, i.e., the race teeth 63 are less than half as wide as the stator slots 32S. The collective profiles of the race teeth 63 and the adjacent race slots 62 are thus configured to reduce torque ripple by increasing slot frequency, as will be appreciated by those of ordinary skill in the art.

The race slots 62 extend along substantially all of the length of the crescent-shaped race 61, and therefore distal ends of the race 61 may be potted or bonded to end plates (not shown) to provide structural support. Alternatively, a thin rim 64 of ferrous material may be formed at a radially-outermost surface 65 and/or radially-innermost surface 66 of the race 61 to provide the aforementioned structural support.

As shown in FIG. 5, the rotary electric machine 120 has symmetrical left and right halves LH and RH from the perspective of FIG. 6, which depicts an example moment in time during which the stator electromagnets 32M located in the left half (LH) are in an energized state, and during which the crescent-shaped race 61 effectively fills the airgap opposite the instantaneous center of rotation (COR). The crescent-shaped race 61 rotates in conjunction with the rotor shaft 33 of FIG. 7 to which the race 61 is coupled, i.e., about axis 144, and thus remains opposite the instantaneous center of rotation as the rotor 30 orbits radially within the stator 32. In this manner, the size of the airgap is effectively equalized and minimized between the stator 32 and rotor 30 around the entire outer perimeter or circumference of the rotor 30, and therefore around the entire inner perimeter or circumference of the stator 32.

A desirable result of interposing the crescent-shaped race 61 between the stator 32 and the rotor 30 is an increased level of flux density in areas of the rotor 30 located in closer proximity to the energized stator electromagnets 32M, which in the exemplary time point of FIG. 5 are the stator electromagnets 32M located in the left half (LH). Without the crescent-shaped race 61, the airgap progressively widens as one moves away from the instantaneous center of rotation in the direction of arrow CW, and thus the flux density in the rotor 30 progressively decreases. In turn, the amount of torque the rotary electric machine 120 is able to produce will decrease. However, with the crescent-shaped race 61 effectively bridging the airgap around the entire circumference of the rotor 30, magnetic flux from the energized stator magnets 32M is maximized with respect to the rotor 30.

The rotary electric machine 120 is also shown in FIG. 7 in a schematic cross-sectional side view, with the above-described rotor 30, stator 32, RCM 40, and CPL 60. The rotor shaft 33 may be connected to an offset shaft 37 via a bearing B1 to maintain eccentricity of the rotor 30. In the illustrated embodiment, the RCM 40 enforces pure rotary motion and thus requires, at minimum, one rotary constraint. Noise, vibration, and harshness may be reduced by balancing the rotor 30 in some manner, e.g., using counterweights 55. The crescent-shaped race 61 may extend along substantially all of the length of the rotor 30 as shown, with the crescent-shaped race 61 rotating in conjunction with the rotor shaft 33 and thus remaining diametrically opposite the instantaneous center of rotation as the rotor 30 orbits within the stator 32.

While the crescent-shaped race 61 provides a particular rotary ferrous element that effectively fills the airgap between the stator 32 and rotor 30, those of ordinary skill in the art will appreciate that other ferrous structural elements may be used for this purpose. One such approach is depicted in the exemplary rotary electric machine 220 of FIG. 8. Here, stator teeth 32T radially project from a stator core 32C of a stator 232 toward lobes 30A of a rotor 130. The surface 70 of the stator teeth 32T and the surface 72 of the rotor lobes 30A are cycloid-profiled such that the resultant profiles allow for the intended 2DOF of motion, i.e., orbiting and rolling motion of the rotor 130, and also minimize the size of the airgap between the stator 232 and rotor 130 similar to the effect of the race 61 of FIG. 5. In this manner, the profiles of FIG. 8 reduce the reluctance of the magnetic circuit formed between the rotor 130 and stator 232. In turn, the reduced reluctance enables maximum torque production of the rotary electric machine 220.

For example, the rotor 130 is eccentrically positioned within the stator 232, which in this instance is modified to include a plurality of profiled stator teeth 132T each having a respective profiled surface 70. Likewise, the rotor 130 has a mating cycloid-profiled surface 72 on each of its lobes 30A. The surface 70 extends radially toward the surface 72, and vice versa, while allowing unobstructed relative cycloidal motion between the stator 232 and rotor 130. As with the embodiment of FIG. 5, flux density in the rotor 130 is maximized wherever the airgap is at a minimum, e.g., at points P1, P2, and P3 in the instant in time shown in FIG. 8. An alternative stator 332 is shown in FIG. 10 with a larger number of stator teeth 232T, with the stator electromagnets 32M of FIG. 8 omitted for illustrative clarity.

Figure 8:
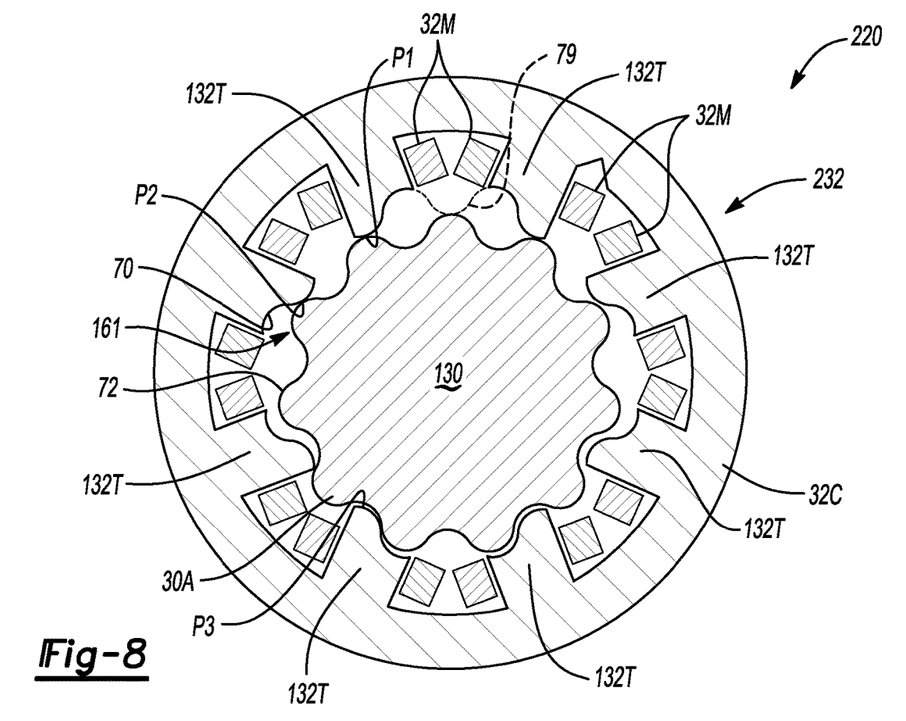
FIG. 8 is a schematic cross-sectional illustration of an embodiment of the cycloidal reluctance machine having profiled stator teeth and rotor lobes that minimize the size of a stator-rotor airgap.
Figure 9:
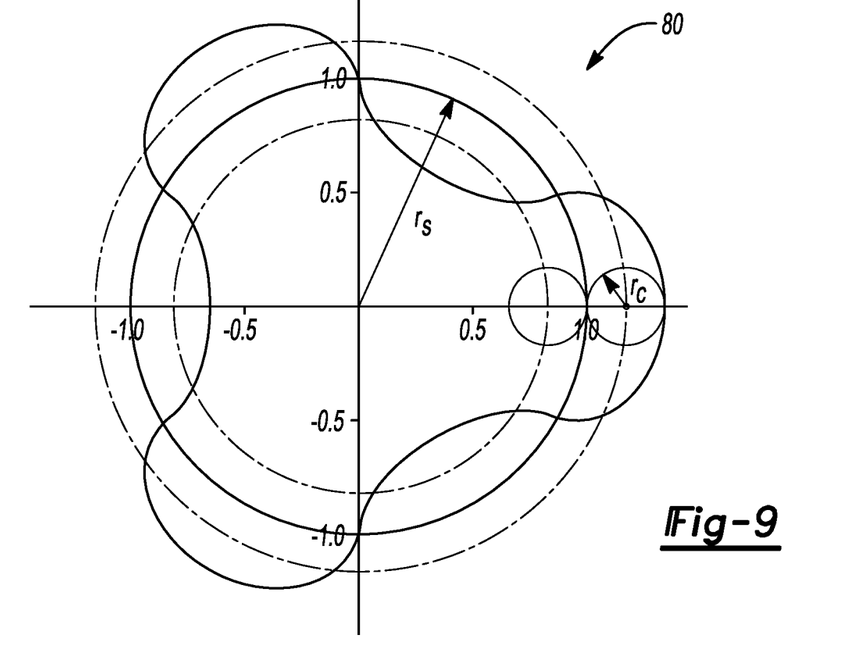
FIG. 9 is a representative geometric surface profile for forming radii of the rotor and stator in the example embodiment show in FIG. 8.
Figure 10:
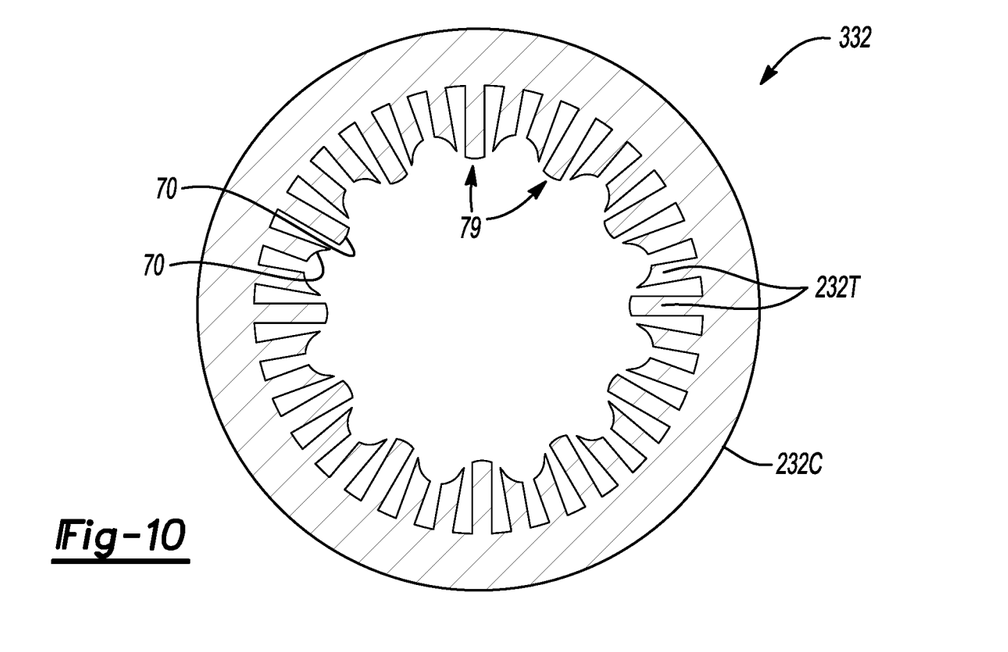
FIG. 10 is a schematic cross-sectional illustration of an embodiment of a stator for use with the cycloidal reluctance machine.

The cycloid-profiled surfaces 70 and 72 of FIGS. 8 and 10 may be understood with reference to the geometric surface profile 80 shown in FIG. 9, where $r_s$ is the surface radius of either of the rotor 130 and stator 232 or 332, and $r_c$ is the radius of an imaginary profiling roller, as will be appreciated. For optimal magnetic performance, if one were to imagine all of the potential lobes 79 of the stator 232 or 332 as though the stator slots 32S were not yet formed, then the number of stator teeth 32T exceeds the number of stator lobes 79, e.g., by more than 1.5 times. FIG. 10, which shows a stator 332 that can be used with the rotor 130 of FIG. 8, shows such an example, i.e., thirty-six stator teeth 232T arranged to form twelve stator lobes 79 for a factor of 3×. Additionally, the cycloid-profiled surfaces 70 of the stator teeth form stator lobes 79, with portions of some such lobes 79 being present on the stator teeth 132T and other portions or entireties of such stator lobes 79 removed from between adjacent stator teeth 132T when forming the stator slots 32S.

Thus, with (N) stator lobes 79 present, a number (n) of rotor lobes 30A is one fewer than N, i.e., n=N−1, for instance with eleven rotor lobes 30A (n=11) and twelve stator lobes 79 (N=12) shown in the non-limiting example configuration of FIG. 8, and with the twelve stator lobes 79 shown in FIG. 10. Additionally, $$r_c = r_{c,max} = e - g0$$

where e is the eccentricity and g0 is the minimum airgap. Thus, if $r_c < e-g0$, multiple layers of profiles may be used to better fill the airgap and improve magnetic performance.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. An electrical system comprising:
   a direct current (DC) voltage bus;
   a power inverter module (PIM) connected to the DC voltage bus;
   a polyphase cycloidal electric machine connected to the PIM, and having a stator and a rotor with respective stator and rotor axes, wherein the rotor axis is eccentric with respect to the stator axis, an airgap is defined between the stator and the rotor, and the rotor moves with two degrees of freedom (2DOF), the 2DOF including rotating motion about the rotor axis and orbiting motion about the stator axis; and
   a rotor constraint mechanism (RCM) configured to constrain motion of the rotor, such that the rotor generates and transmits output torque to a coupled load in at least one of the 2DOF;
   wherein the cycloidal electric machine includes a structural element connected to or formed integrally with the rotor or the stator that is configured to minimize and substantially equalize a size of the airgap around a circumference of the rotor.

2. The electrical system of claim 1, wherein the structural element is a crescent-shaped race constructed of ferrous material that is coupled to a rotor shaft of the rotor and that extends along a length of the rotor, and wherein the crescent-shaped race remains opposite an instantaneous center of rotation of the electric machine as the rotor orbits about the stator axis.

3. The electrical system of claim 2, wherein the crescent-shaped race includes race teeth and defines race slots, and wherein each respective one of the race slots is separated by an adjacent pair of the race teeth.

4. The electrical system of claim 3, wherein the stator includes a plurality of stator teeth and a plurality of stator slots therebetween, and a plurality of stator electromagnets each of which is disposed within a respective one of the stator slots, and wherein the electric machine has at least twice as many of the race slots as the stator slots.

5. The electrical system of claim 4, wherein the race slots are at least as wide as the airgap.

6. The electrical system of claim 4, wherein the race teeth are less than half as wide as the stator slots.

7. The electrical system of claim 1, wherein the stator includes radially-inward projecting stator teeth, the rotor includes radially-outward projecting lobes, and the stator teeth and rotor lobes have respective cycloid-profiled surfaces that together form the structural element.

8. The electrical system of claim 7, wherein the cycloid-profiled surfaces of the stator teeth form stator lobes, and the stator has at least 1.5 times as many of the stator teeth as the stator lobes.

9. The electrical system of claim 7, wherein the cycloid-profiled surfaces of the stator teeth form (N) stator lobes, the rotor has (n) rotor lobes, and n=N−1.

10. The electrical system of claim 1, further comprising a downstream coupling mechanism coupled to the rotor and configured to translate the 2DOF into 1DOF, wherein the 1DOF is the rotating motion about the rotor axis without the orbiting motion about the stator axis.

11. The electrical system of claim 10, wherein the load is a drive axle of a vehicle.

12. A cycloidal electric machine comprising:
   a cylindrical stator having a stator axis;
   a cylindrical rotor having a rotor axis that is positioned radially within the cylindrical stator such that the rotor axis is eccentric with respect to the stator axis, and such that an airgap is defined between the stator and the rotor, wherein the rotor is configured to move with two degrees of freedom (2DOF), the 2DOF including rotating motion about the rotor axis and orbiting motion about the stator axis;
   a rotor constraint mechanism (RCM) configured to constrain motion of the rotor, such that the rotor is able to generate and transmit output torque to a coupled load in at least one of the 2DOF; and a structural element connected to or formed integrally with the cylindrical rotor or the cylindrical stator that is configured to minimize and substantially equalize a size of the airgap around a circumference of the rotor.

13. The cycloidal electric machine of claim 12, wherein the structural element is a crescent-shaped race constructed of ferrous material that is coupled to a rotor shaft of the rotor and that extends along a length of the rotor, and wherein the crescent-shaped race remains opposite an instantaneous center of rotation of the electric machine as the rotor orbits about the stator axis.

14. The cycloidal electric machine of claim 13, wherein the crescent-shaped race includes a plurality of race teeth and defines a plurality of race slots, and wherein each respective one of the race slots separates an adjacent pair of the race teeth.

15. The cycloidal electric machine of claim 14, wherein the stator includes a plurality of stator teeth and a plurality of stator slots therebetween and a plurality of stator electromagnets each disposed within a respective one of the stator slots, the electric machine has at least twice as many of the race slots as the stator slots, and the race slots are at least as wide as the airgap.

16. The cycloidal electric machine of claim 15, wherein the race teeth are less than half as wide as the stator slots.

17. The cycloidal electric machine of claim 12, wherein the stator includes radially-inward projecting stator teeth, the rotor includes radially-outward projecting lobes, and the stator teeth and rotor lobes have respective cycloid-profiled surfaces that form the structural element.

18. The cycloidal electric machine of claim 17, wherein the cycloid-profiled surfaces of the stator teeth form stator lobes, and the stator has at least 1.5 times as many of the stator teeth as the stator lobes.

19. The cycloidal electric machine of claim 12, wherein the cycloid-profiled surfaces of the stator teeth form (N) stator lobes, the rotor has (n) rotor lobes, and n=N−1.

20. The cycloidal electric machine of claim 12, further comprising a downstream coupling mechanism coupled to the rotor and configured to translate the 2DOF into 1DOF, wherein the 1DOF is the rotating motion about the rotor axis without the orbiting motion about the stator axis.

* * * * *